T. PRITCHARD.
ANIMAL TRAP.
APPLICATION FILED DEC. 22, 1909.
1,053,217.
Patented Feb. 18, 1913.
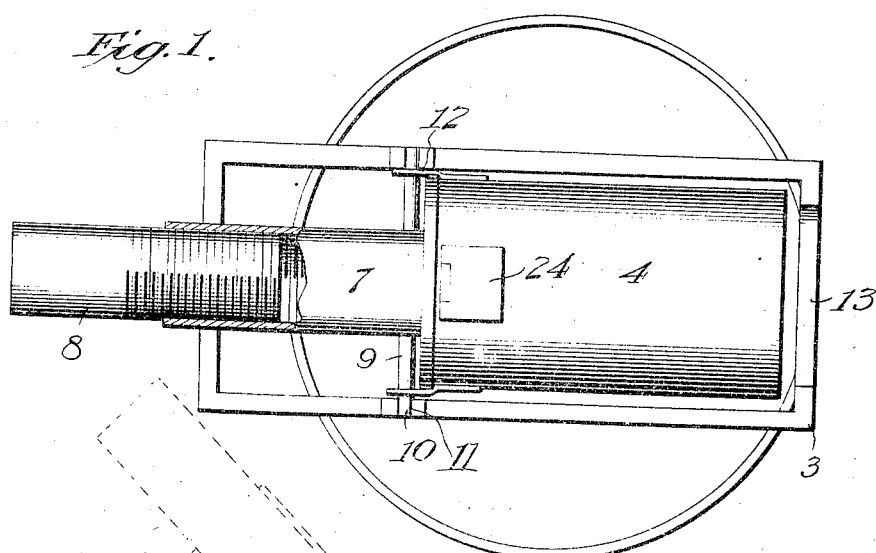
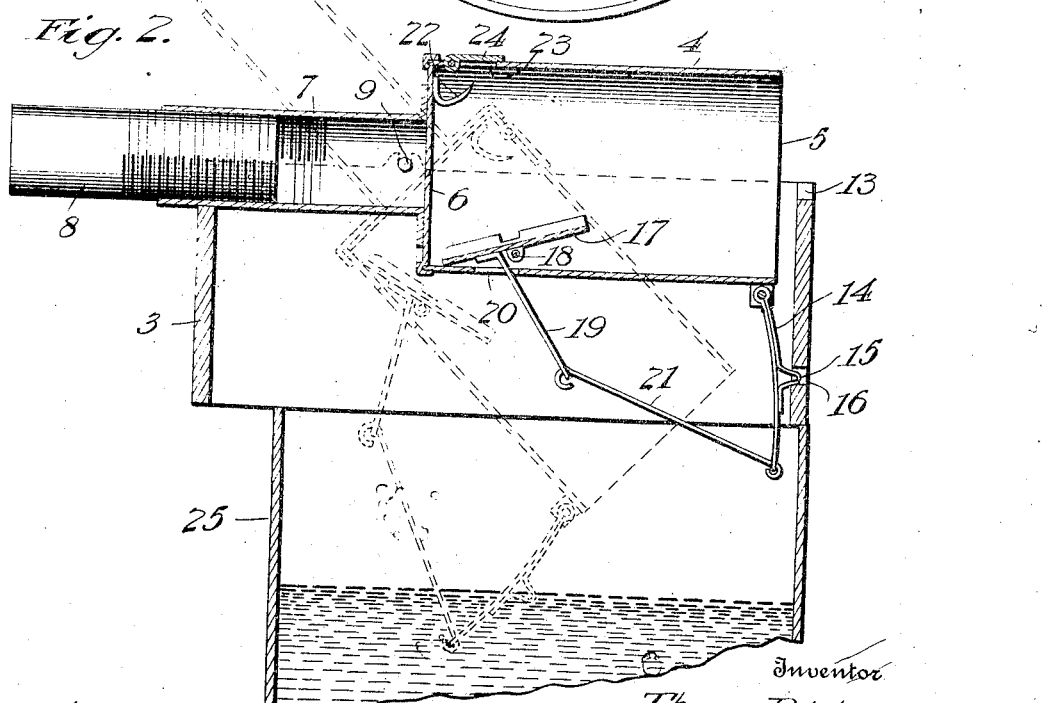

UNITED STATES PATENT OFFICE.

THOMAS PRITCHARD, OF DIXIE, IDAHO.

ANIMAL-TRAP.

1,053,217.

Specification of Letters Patent.

Patented Feb. 18, 1913.

Application filed December 22, 1909. Serial No. 534,513.

*To all whom it may concern:*

Be it known that I, THOMAS PRITCHARD, a citizen of the United States, residing at Dixie, in the county of Idaho and State of Idaho, have invented new and useful Improvements in Animal-Traps, of which the following is a specification.

The present invention relates to animal traps, and the object is to provide a simple and effective device, whereby either small or large animals may be caught and either killed or retained alive, as may be desired.

The preferred form of construction is illustrated in the accompanying drawings, wherein:—

Figure 1 is a top plan view of the trap; Fig. 2 is a longitudinal sectional view therethrough.

Similar reference numerals designate corresponding parts in all the figures of the drawings.

In the embodiment disclosed, an open supporting frame 3 is provided that is oblong in shape, and arranged in said frame, is a downwardly swinging tubular animal receiver 4 having an open front end 5 and a closed rear end 6, the closed end carrying a tubular stem 7, in which is detachably threaded a counterbalancing weight 8. The mounting for this animal receiver is in the form of a transverse pin 9 extending through the stem 7, and having its ends projecting to form trunnions 10 that are journaled, as shown at 11 on the side bars of the frame. The tubular animal receiver 4 is preferably provided with ears 12 that engage the trunnions in order to maintain the same in proper relation to the receiver. The stem 7 rests in the rear end of the frame 3 when the receiver 4 is in position for the reception of the animal, said rear end of the frame and the said stem coöperating to prevent the weight 8 swinging to an inoperative position. When the receiver is in horizontal position, its lower side is preferably below the upper edge of the frame, and the front bar of said frame is cut-away, as shown at 13. A latch 14, pivoted to the under side at the open end, has a forwardly projecting tooth 15 that detachably engages in a socket 16 formed in the front bar of the frame, and thus normally holds the receiver in said horizontal position. A tread 17, pivoted, as shown at 18, within the rear portion of the receiver, carries a depending arm 19 that extends through a slot 20 in the lower side of said receiver, and this arm has a link connection 21 with the lower end of the latch.

A suitable bait-holding device, preferably in the form of a hook 22 is arranged within the rear portion of the animal receiver, and access thereto is had through an opening 23 formed in the top of the receiver. The opening is normally closed by a swinging door 24.

In use, the trap is placed upon a receptacle, as 25, and if the animals are to be killed, this receptacle is partially filled with water. The counterbalancing weight is so adjusted that it will just bring the receiver 4 to its horizontal position, and permit the latch 15 to engage the notch 16 when there is nothing in the trap. The said trap being baited, it will be evident that whenever an animal is attracted by the bait, it will enter the open end and in attempting to reach said bait will step upon the tread 17. Consequently the tread will be moved and the latch disengaged from the supporting frame. The weight of the animal will overbalance the weight 8, and cause the receiver to assume the position indicated in dotted lines in Fig. 2, whereupon said animal will slip downwardly or into the receptacle 25. As soon as it has left the receiver, the weight 8 will react and return the said receiver to its first position, so that it is self-setting and ready to receive another animal. The first animal will be drowned in the water or if there is no water in the receptacle, cannot escape and will be retained alive.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

In a trap of the character set forth, the combination of a supporting frame open at top and bottom and provided with a recess in its forward end, a tubular animal receiver pivoted in the frame and having an open front and a closed rear end, a latch pivoted to the under side of the receiver at its front end and detachably engaging in the recess of the support, a bait-holding device located in the closed end of the receiver, a tread pivoted intermediate its ends in the receiver and having, to the rear of its pivot, a link connection with the latch, a tubular stem projecting from the closed rear end of the receiver and normally resting upon the rear end of the supporting frame to prevent the raising of the front end of the receiver out of the frame, and a counterbalancing weight adjustable longitudinally in said tubular stem.

In testimony whereof, I affix my signature in presence of two witnesses.

THOMAS PRITCHARD.

Witnesses:
ALBERT H. McKNIGHT,
BENTLEY S. CULLEN.